United States Patent
Paul

(10) Patent No.: US 9,624,801 B2
(45) Date of Patent: Apr. 18, 2017

(54) MITIGATING SYSTEM TO REMOVE CONTAMINANTS FROM AN EXHAUST GAS AND GENERATE ELECTRICAL POWER

(71) Applicant: Buddy Ray Paul, Griffin, GA (US)

(72) Inventor: Buddy Ray Paul, Griffin, GA (US)

(73) Assignee: AETHERIS RENEWABLE ENERGY, LLC, Miramar, FL (US)

( * ) Notice: Subject to any disclaimer, the term of this patent is extended or adjusted under 35 U.S.C. 154(b) by 216 days.

(21) Appl. No.: 14/719,540

(22) Filed: May 22, 2015

(65) Prior Publication Data

US 2016/0341085 A1 Nov. 24, 2016

(51) Int. Cl.
*B01D 50/00* (2006.01)
*F01N 3/037* (2006.01)
*F01N 5/04* (2006.01)

(52) U.S. Cl.
CPC ............. *F01N 3/037* (2013.01); *F01N 5/04* (2013.01); *F01N 2590/10* (2013.01)

(58) Field of Classification Search
CPC ..... F01N 3/01; F01N 3/02; F01N 4/04; F01N 2590/10; F02G 3/02; F02G 2254/20
USPC ............................. 422/168; 60/645, 599, 618
See application file for complete search history.

(56) References Cited

U.S. PATENT DOCUMENTS

| | | | | |
|---|---|---|---|---|
| 2004/0202914 A1* | 10/2004 | Sridhar | ................... | C01B 3/34 429/411 |
| 2005/0120715 A1* | 6/2005 | Labrador | ................ | F01K 27/00 60/618 |
| 2006/0053791 A1* | 3/2006 | Prentice, III | ............ | F23G 5/006 60/645 |
| 2008/0087017 A1* | 4/2008 | Van Nimwegen | ...... | F01N 3/005 60/599 |

* cited by examiner

*Primary Examiner* — Tom P Duong

(57) ABSTRACT

A mitigating system to remove contaminants from an exhaust gas and generate electrical power utilizes a first and second particle acquisition tower (PAT) unit, a first and second carbon dioxide precipitator (CAP) unit, a clean air turbine (CAT) unit, and a first and second gravity enhance separator (AGES) unit. The first PAT unit receives and purify the exhaust gas as the first AGES unit is in fluid communication with the first PAT unit. The exhaust gas is then respectively discharge and purified through the first CAP unit, the CAT unit, the second PAT unit as the second AGES unit is in fluid communication with the second PAT unit. Then the exhaust gas is discharged and purified through the second CAP unit and released into atmosphere as clean exhaust gas. Additionally, the exhaust gas is able to produce electricity as the exhaust gas bypasses within the CAT unit.

16 Claims, 26 Drawing Sheets

MITIGATING SYSTEM TO REMOVE CONTAMINANTS FROM AN EXHAUST GAS AND GENERATE ELECTRICAL POWER

FIELD OF THE INVENTION

The present invention relates generally to an apparatus for removing containments from the exhaust from industrial hydrocarbon power plants. More specifically, the present invention is a complete mitigating system that removes air pollutants and in so doing generates electrical power and reduces the total amount of fuel consumed per watt.

BACKGROUND OF THE INVENTION

Hydrocarbon power plants are a commonly used form of electrical energy production. However, the environmental impacts of these power plants have been questioned repeatedly. In the process of generating electricity, the power plants release exhaust gas that is harmful to the environment where the exhaust gas accelerates the air pollution process. It is also known that an adequate supply of oxygen in the air is essential for survival. However, the exhaust gas rapidly increases the carbon dioxide concentration in the atmosphere, leading to global warming and ocean acidification as the carbon dioxide dissolves in water to form carbonic acid.

It is the object of the present invention to provide a system which can simultaneously reduce the amount of hydrocarbon per watt and improve the air quality while generating electrical power. More specifically, the present invention utilizes an artificial gravity enhance separator (AGES) unit, a particulate acquisition tower (PAT) unit, a carbon dioxide precipitator (CAP) unit, a clean air turbine (CAT) unit and at least one lift tower so that the present invention can efficiently function as a complete system. When exhaust gas is enters into the present invention, the exhaust gas is entered into the PAT unit, where the exhaust gas is mixed with fluids to lower the temperature. As the exhaust gas continues its assent the particles adhere to the fluid. The exhaust gas without particles exits from the PAT unit as the light weight partials flow out with the fluid at an upper location of the PAT unit while heavy particles flow out with the fluid at a bottom of the PAT unit. The fluid solution with mixed particles is placed into a rotating chamber of the AGES unit. The chamber's rotation creates centrifugal force separating the particles according to weight. After a time of rotation, the chambers valves expel heaviest particles first and then the lighter particles follow next. The exhaust gas without particles flows into a closed chamber of the CAP unit that surrenders different elements or compound with the correct pressure and temperature. More specifically the CAP unit separates carbon dioxide from other elements present in the exhaust gas without particles. The carbon dioxide turns into a liquid form while the remaining exhaust gas stays in a gas form. With different pressure and temperature in the CAP unit can separate and segregate many different elements and compounds. The liquid carbon dioxide is placed within the lift towers, where additional electricity is created by the placement of the carbon dioxide. The exhaust gas exit from the CAP unit is then circulated through the CAT unit as the exhaust gas is further purified while the exhaust heat can be incorporated into energy production. The purified gas is then able to generate additional power through the lift towers as the enclosed tower facilitates a cascade tower operation to maximize the power generation and further filter, separate or capture $CO_2$ and or other compounds. With this process, the microorganisms contained within the lift tower are also able to benefit from the $CO_2$ as the Lift Tower can further promote the plant growth in green house cultivating farms and reduce the $CO_2$ to oxygen. Each unit of the present invention is able to operate as a system or can be paired with additional units to accommodate the environmental needs, functions or output requirements.

DETAIL DESCRIPTIONS OF THE INVENTION

All illustrations of the drawings are for the purpose of describing selected versions of the present invention and are not intended to limit the scope of the present invention.

Figure 1A:
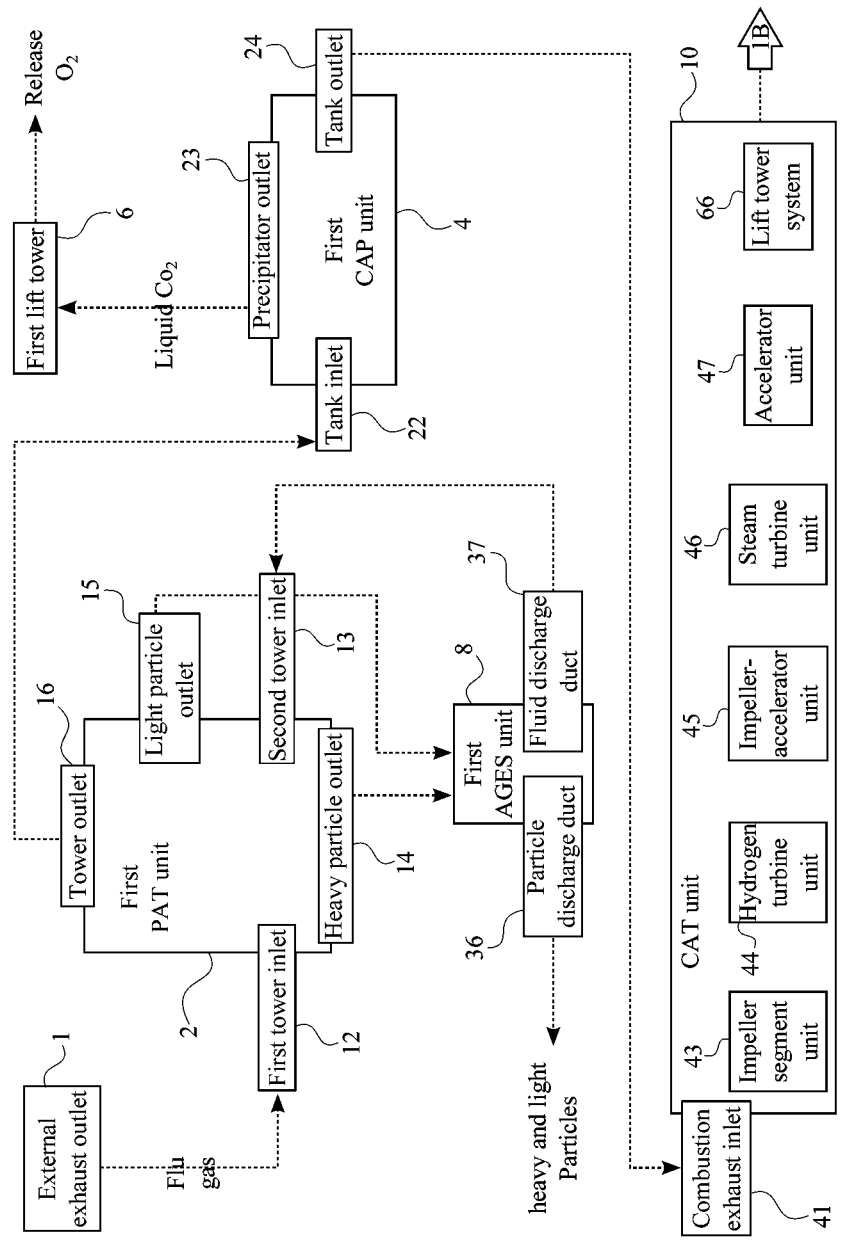
FIG. 1A is a basic flowchart illustrating the first half of the overall method of the present invention, wherein the second half is shown in FIG. 1B.

In accordance with the disclosure flu gas entering the mitigation system is transformed into useful environmental products through the present invention, where the present invention is a mitigating system that may be used by coal, natural gas or any hydro-carbon power plant to remove contaminants from exhaust gas and to generate electrical power. In reference to FIG. 1A and FIG. 1B, the present invention comprises a first particle acquisition tower (PAT) unit 2, a second particle acquisition tower (PAT) unit 3, a first carbon dioxide precipitator (CAP) unit 4, a second carbon dioxide precipitator (CAP) unit 5, a first artificial gravity enhance separator (AGES) unit 8, a second artificial gravity enhance separator (AGES) unit 9, and a clean air turbine (CAT) unit 10. These components are in fluid communication as a system so that the exhaust gas able to travel through the present invention as the exhaust gas goes through many different purifying processes and electricity generating processes. In reference to the general configuration of the present invention, an external exhaust outlet 1 is in fluid communication with the first PAT unit 2, wherein the external exhaust outlet 1 emits the exhaust gas. Then the first PAT unit 2 is in fluid communication with the first CAP unit 4. The first AGES unit 8 is in fluid communication with the first PAT unit 2 so that the first AGES unit 8 is able to operate in conjunction with the first PAT unit 2. The first CAP unit 4 is in fluid communication with the CAT unit 10 as the CAT unit 10 is in fluid communication with the second PAT unit 3. The second PAT unit 3 is in fluid communication with the second CAP unit 5, and the second AGES unit 9 is in fluid communication with the second PAT unit 3 so that the second AGES unit 9 is able to operate in conjunction with the second PAT unit 3. As the final stage, the purified exhaust gas is released into the atmosphere from the second CAP unit 5.

Figure 2:
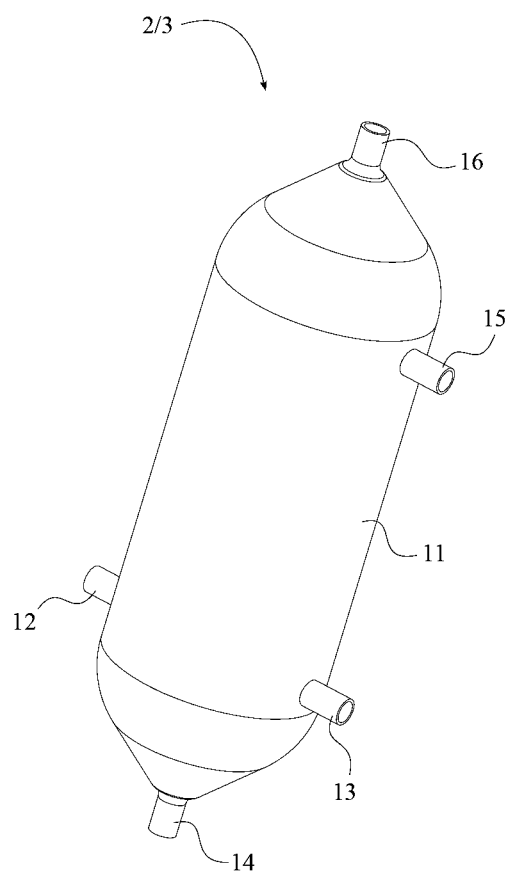
FIG. 2 is a perspective view of the first or second particle acquisition tower (PAT) unit of the present invention.
Figure 3:
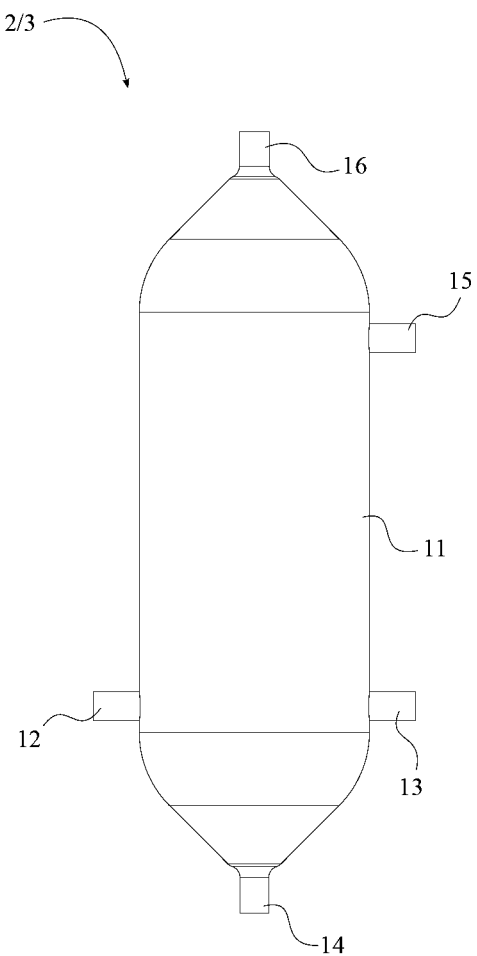
FIG. 3 is a side view of the first or second PAT unit of the present invention.
Figure 4:
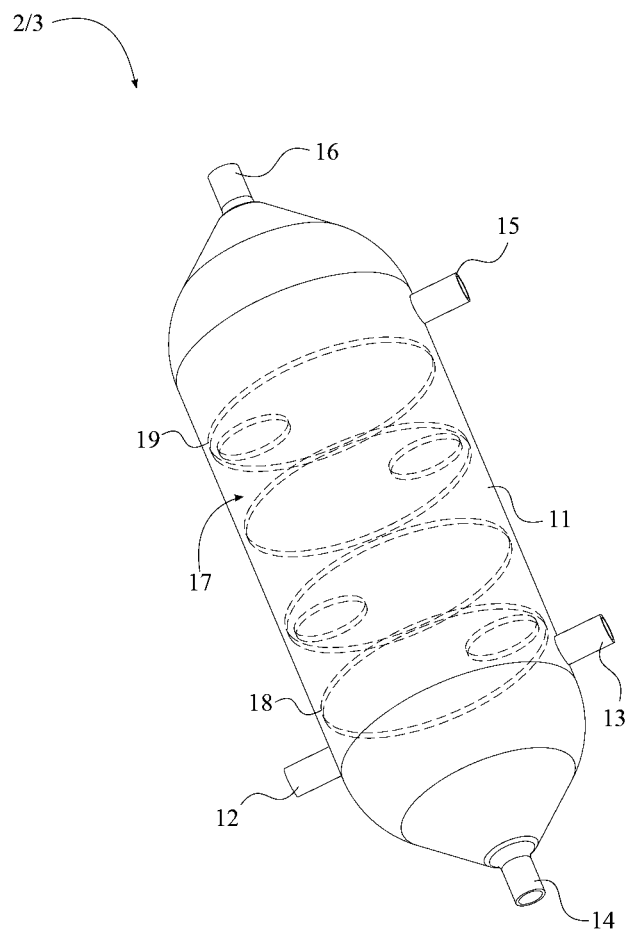
FIG. 4 is a perspective view of the first or second PAT unit of the present invention, wherein the dash lines illustrate the plurality of control baffles.

The first PAT unit 2 and the second PAT unit 3 remove particles from the exhaust gas and in doing so reduce the temperature of the exhaust gas. In reference to FIG. 2, FIG. 3, and FIG. 4, the first PAT unit 2 and the second PAT unit 3 each comprise a vessel 11, a first tower inlet 12, a second tower inlet 13, a heavy particle outlet 14, a light particle outlet 15, a tower outlet 16, and a plurality of control baffles 17. The exact positioning of the first PAT unit 2 and the second PAT unit 3 in relation to the other components of the present invention are described later. The vessel 11 that is preferably shaped into a cylindrical form functions as the main component of the first PAT unit 2 and the second PAT unit 3. The first tower inlet 12, the second tower inlet 13, the heavy particle outlet 14, the light particle outlet 15, and the tower outlet 16 are in fluid communication with the vessel 11. The plurality of control baffles 17 is internally connected along the vessel 11 in such a way that each of the plurality of control baffles 17 is evenly distributed along the vessel 11. The plurality of control baffles 17 provides a serious of filters so that unnecessary particles can be strained as the exhaust fluid mixture travels within the vessel 11. The heavy particle outlet 14, that discharges a heavy particle mixture away from the first PAT unit 2 and the second PAT unit 3, and the tower outlet 16 which discharges particle free exhaust gas from the first PAT unit 2 and the second PAT unit 3 are oppositely positioned from each other across the vessel 11. The first tower inlet 12 and the second tower inlet 13 are adjacently positioned with a first outer baffle 18 of the plurality of control baffles 17 and the heavy particle outlet 14. The light particle outlet 15 is adjacently positioned with a second outer baffle 19 of the plurality of control baffles 17 and the tower outlet 16 as the light particle outlet 15 discharges a light particle mixture away from the first PAT unit 2 and the second PAT unit 3. The exhaust fluid mixture that is present within the vessel 11 allows the heavy particle mixture and the light particle mixture discharge as a two stage purification process. More specifically, the first tower inlet 12 of the first PAT unit 2 receives exhaust gas from the external exhaust outlet 1 while the second tower inlet 13 of the first PAT unit 2 receives clean fluid from the first AGES unit 8. As a result, the exhaust fluid mixture can be formed within the vessel 11 of the first PAT unit 2 in order to filter out the heavy particle mixture and the light particle mixture. Similarly, the first tower inlet 12 of the second PAT unit 3 receives exhaust gas from the CAT unit 10 while the second tower inlet 13 of the second PAT unit 3 receives clean fluid from the second AGES unit 9. As a result, the exhaust fluid mixture can be formed within the vessel 11 of the second PAT unit 3 in order to filter out the heavy particle mixture and the light particle mixture.

Figure 5:
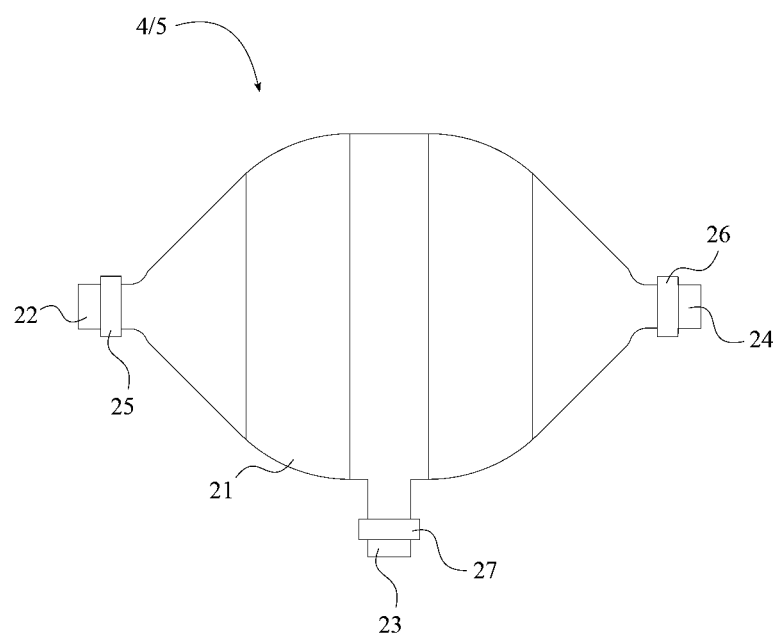
FIG. 5 is a side view of the first or second carbon dioxide precipitator (CAP) unit of the present invention.
Figure 6:
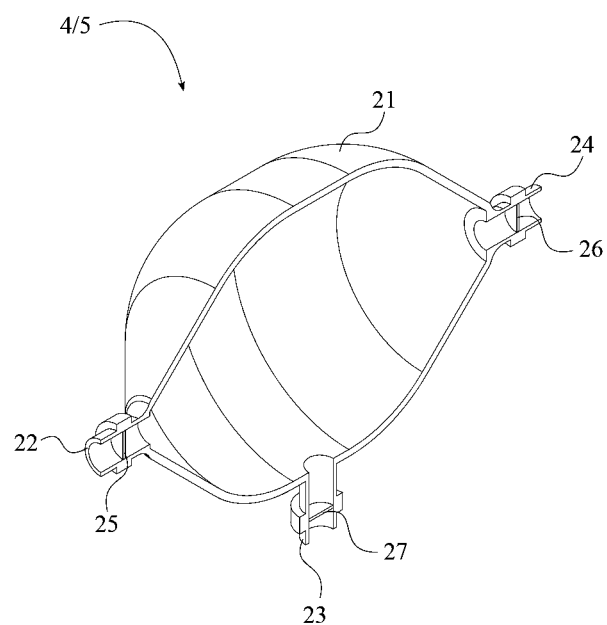
FIG. 6 is a perspective cross-sectional view of the first or second CAP unit of the present invention.

The first CAP unit 4 and the second CAP unit 5 separate carbon dioxide from other elements present in the exhaust gas as the carbon dioxide turns into a liquid form while the remaining exhaust gas stays in a gas form. In reference to FIG. 5 and FIG. 6, the first CAP unit 4 and the second CAP unit 5 each comprise a storage tank 21, a tank inlet 22, a precipitator outlet 23, a tank outlet 24, an inlet valve 25, a first outlet valve 26, and a second outlet valve 27. The exact positioning of the first CAP unit 4 and the second CAP unit 5 in relation to the other components of the present invention are described later. The tank inlet 22 is in fluid communication with the storage tank 21 through the inlet valve 25 as the inlet valve 25 operates in between an opened-position and a closed-position. Similarly, the tank outlet 24 is in fluid communication with the storage tank 21 through the first outlet valve 26, where the first outlet valve 26 functions similar to the inlet valve 25. Additionally, the tank inlet 22 and the tank outlet 24 are oppositely positioned from each other across the storage tank 21. The precipitator outlet 23, which removes the liquid carbon dioxide from the storage tank 21, is in fluid communication with the storage tank 21 through the second outlet valve 27 and positioned in between the tank inlet 22 and the tank outlet 24.

Figure 7:
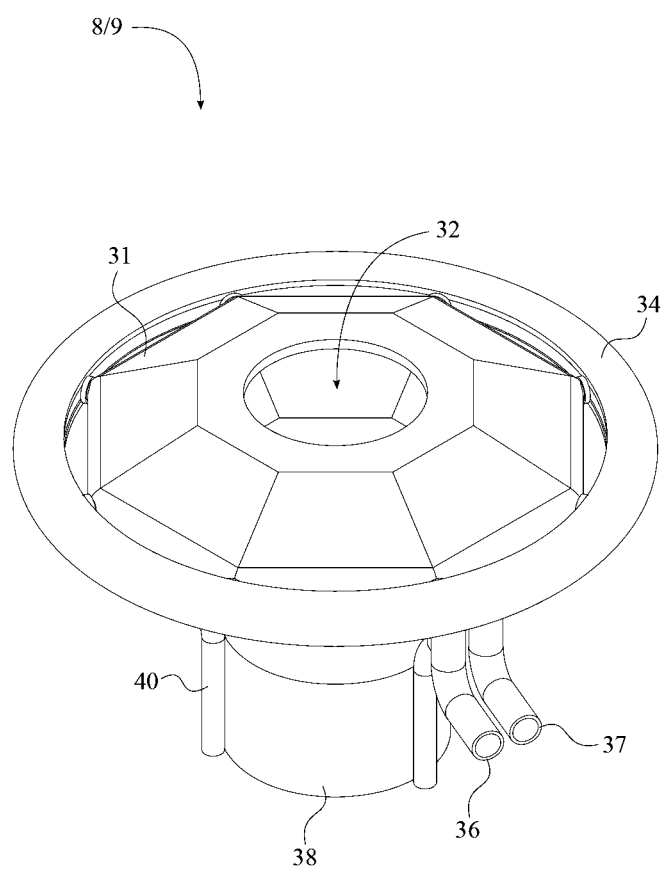
FIG. 7 is a perspective view of the first or second artificial gravity enhance separator (AGES) unit of the present invention.
Figure 8:
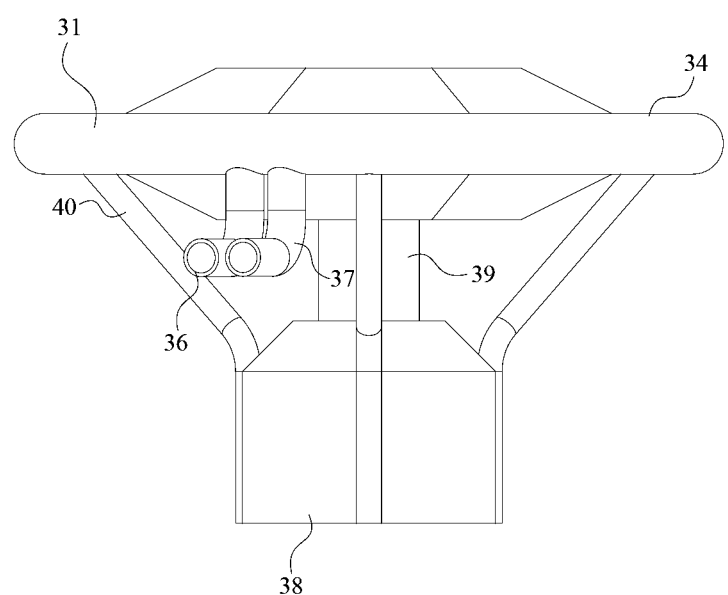
FIG. 8 is a side view of the first or second AGES unit of the present invention.
Figure 9:
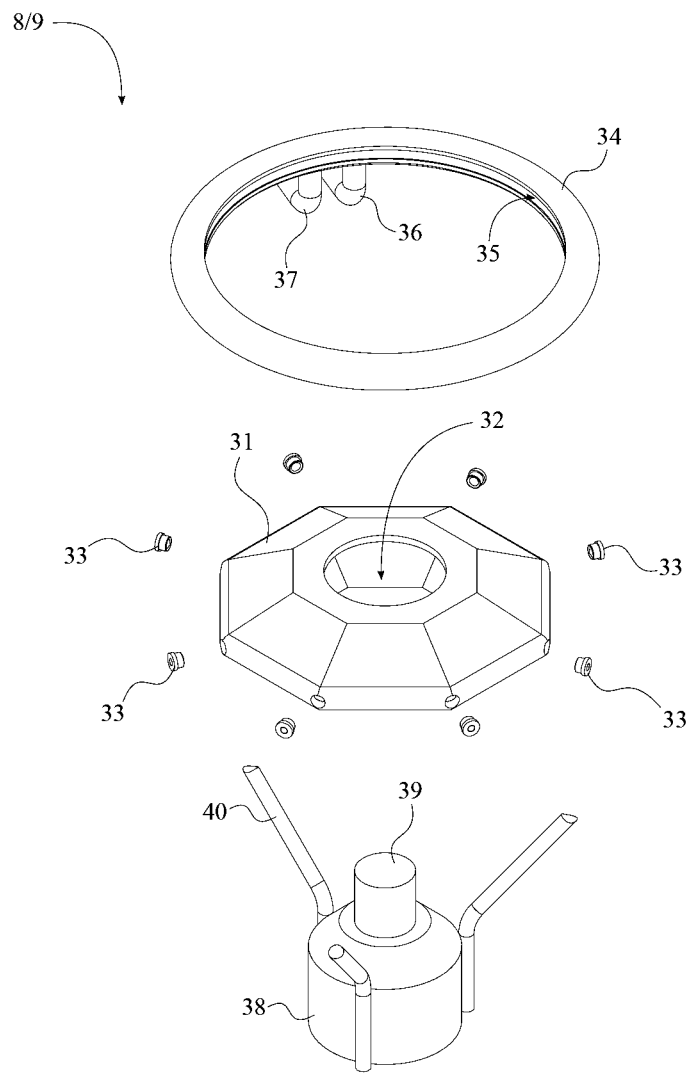
FIG. 9 is a perspective exploded view of the first or second AGES unit of the present invention.
Figure 10:
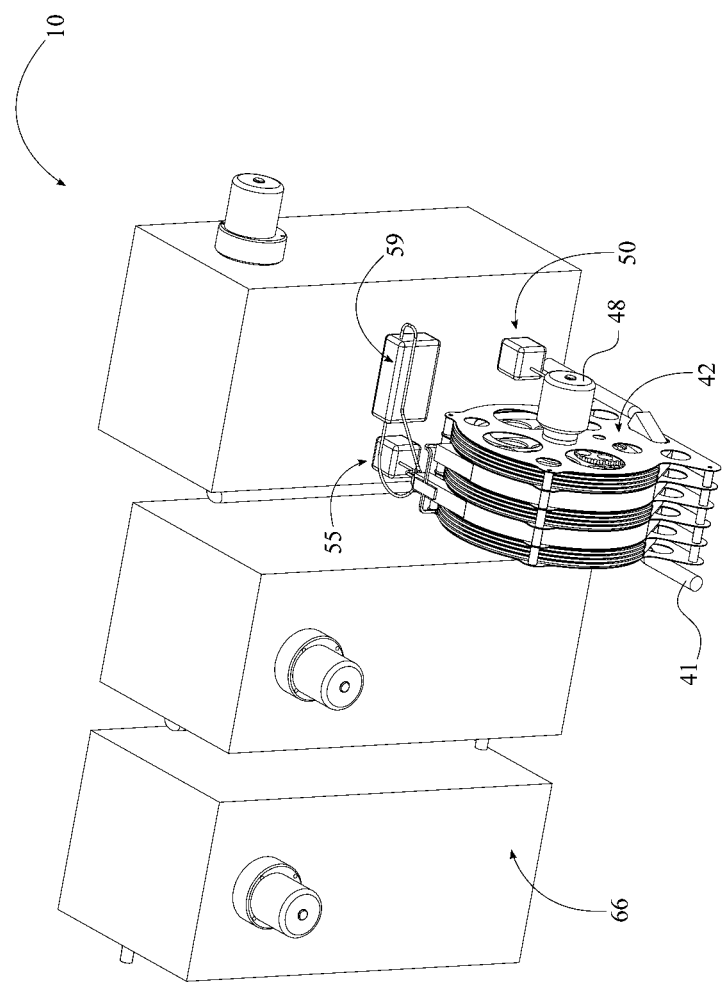
FIG. 10 is a perspective view of the clean air turbine (CAT) unit of the present invention.
Figure 11:
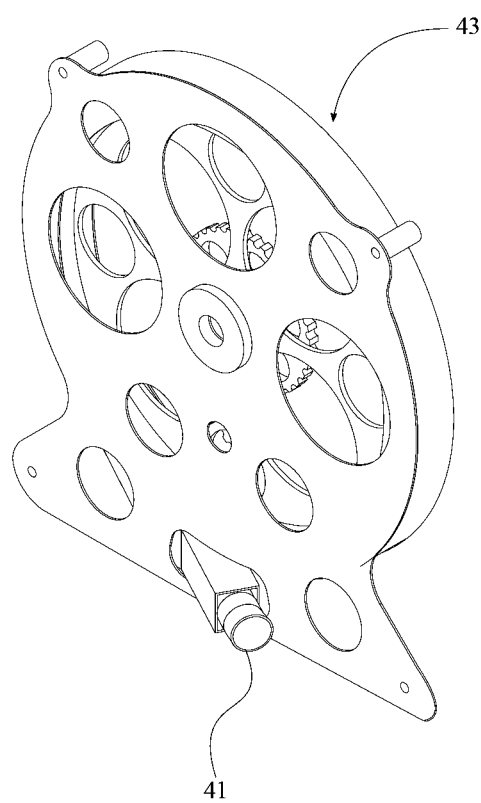
FIG. 11 is a perspective view of the impeller segment unit of the CAT unit of the present invention.
Figure 12:
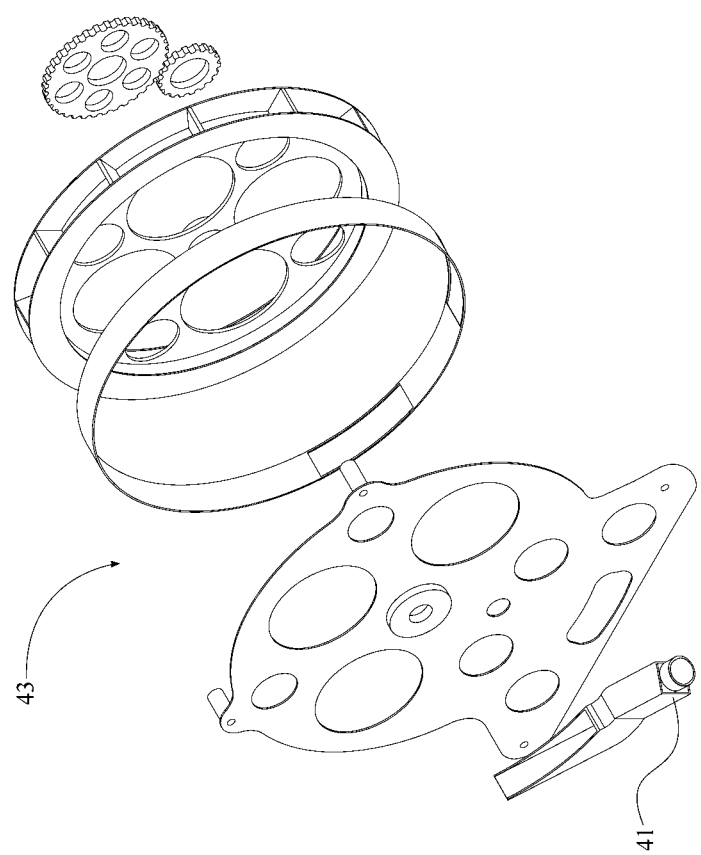
FIG. 12 is a perspective exploded view of the impeller segment unit of the CAT unit of the present invention.
Figure 13:
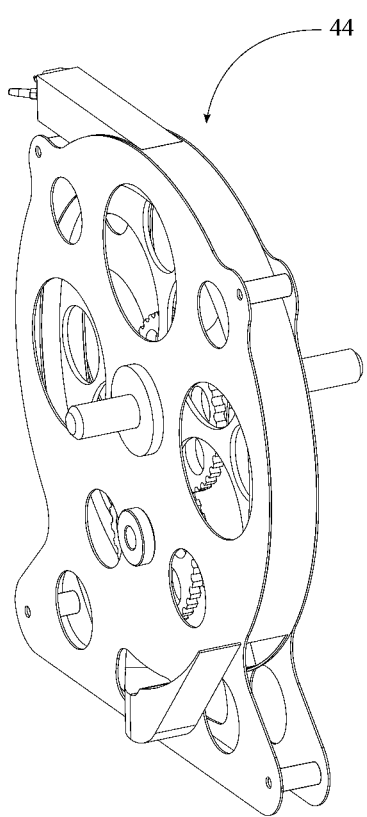
FIG. 13 is a perspective view of the hydrogen turbine unit of the CAT unit of the present invention.
Figure 14:
FIG. 14 is a perspective exploded view of the hydrogen turbine unit of the CAT unit of the present invention.
Figure 15:
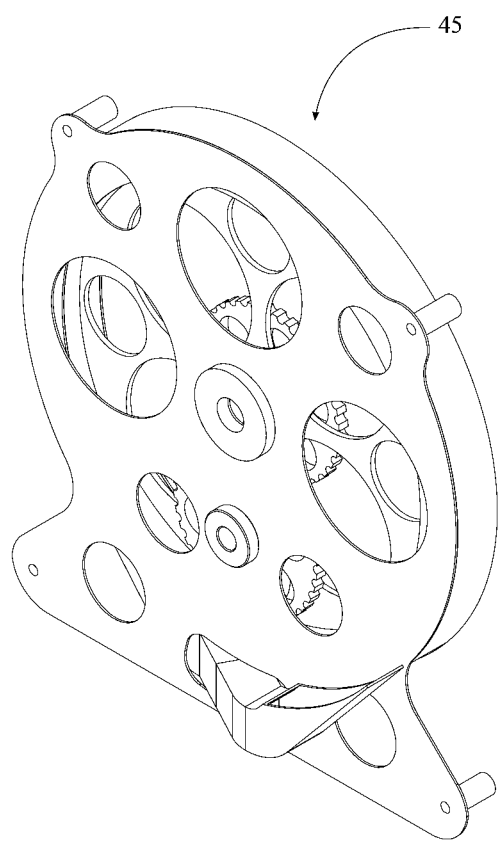
FIG. 15 is a perspective view of the impeller-accelerator unit of the CAT unit of the present invention.
Figure 16:
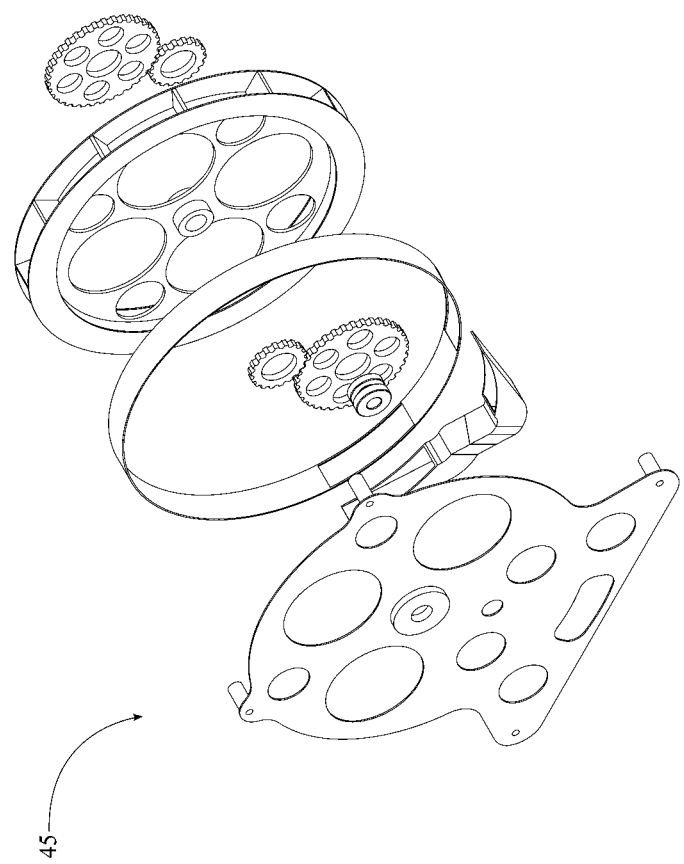
FIG. 16 is a perspective exploded view of the impeller-accelerator unit of the CAT unit of the present invention.
Figure 17:
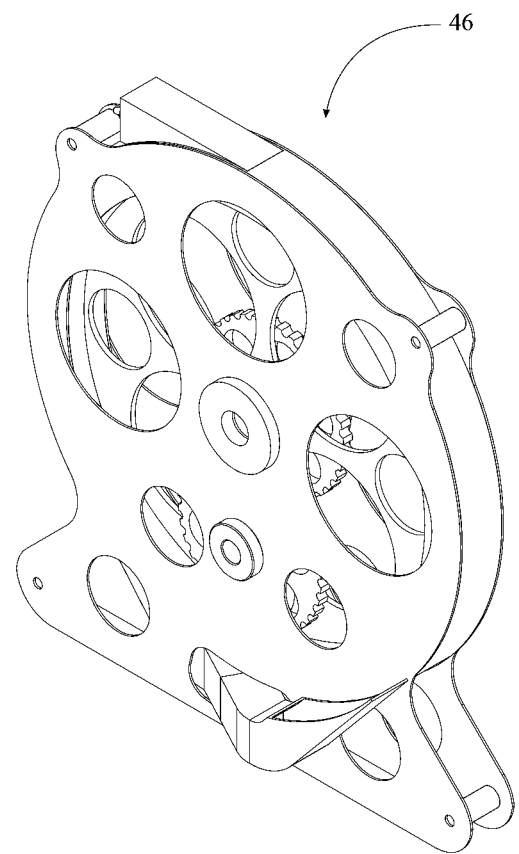
FIG. 17 is a perspective view of the steam turbine unit of the CAT unit of the present invention.
Figure 18:
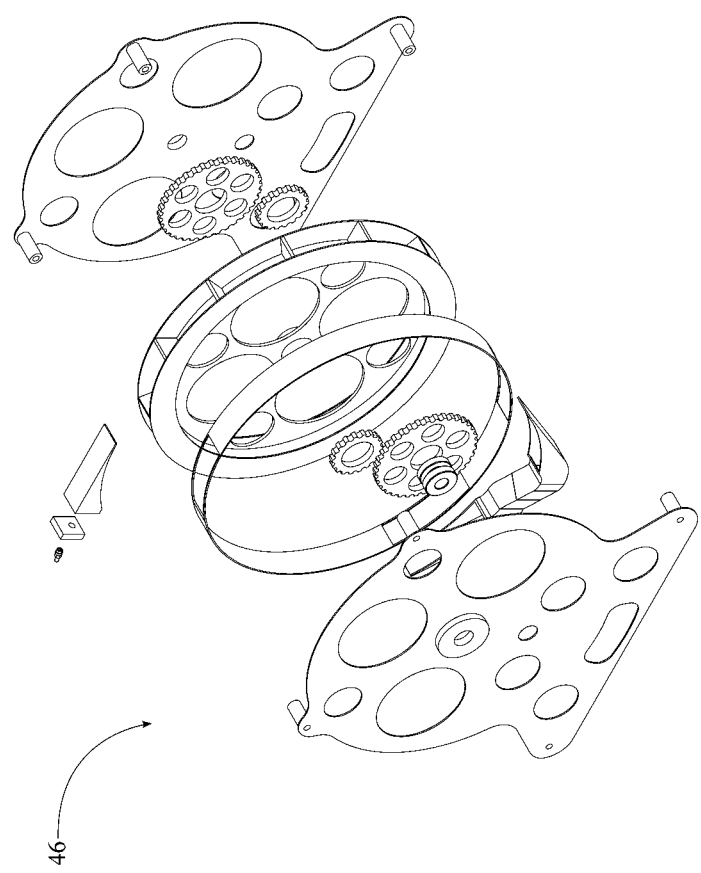
FIG. 18 is a perspective exploded view of the steam turbine unit of the CAT unit of the present invention.
Figure 19:
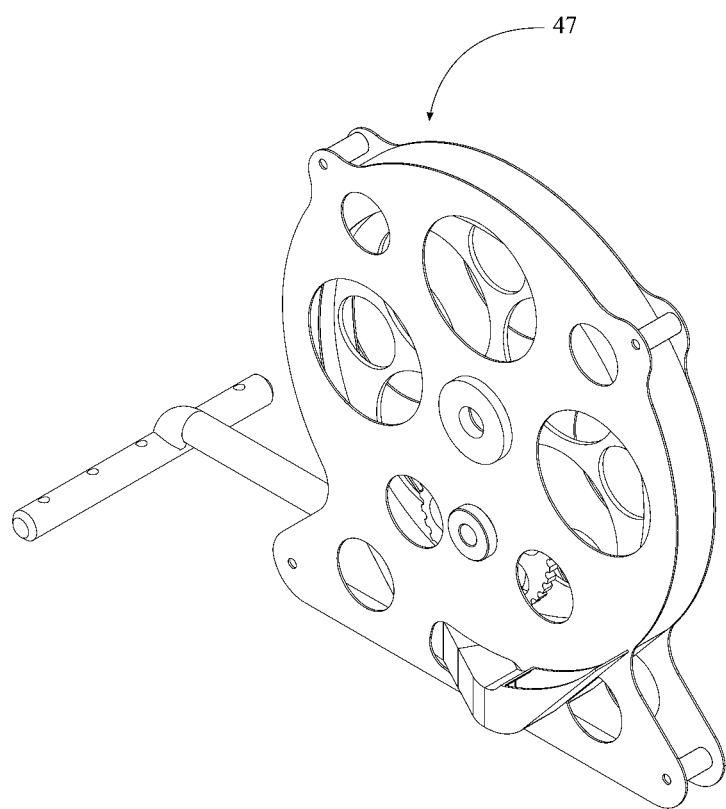
FIG. 19 is a perspective view of the accelerator unit of the CAT unit of the present invention.
Figure 20:
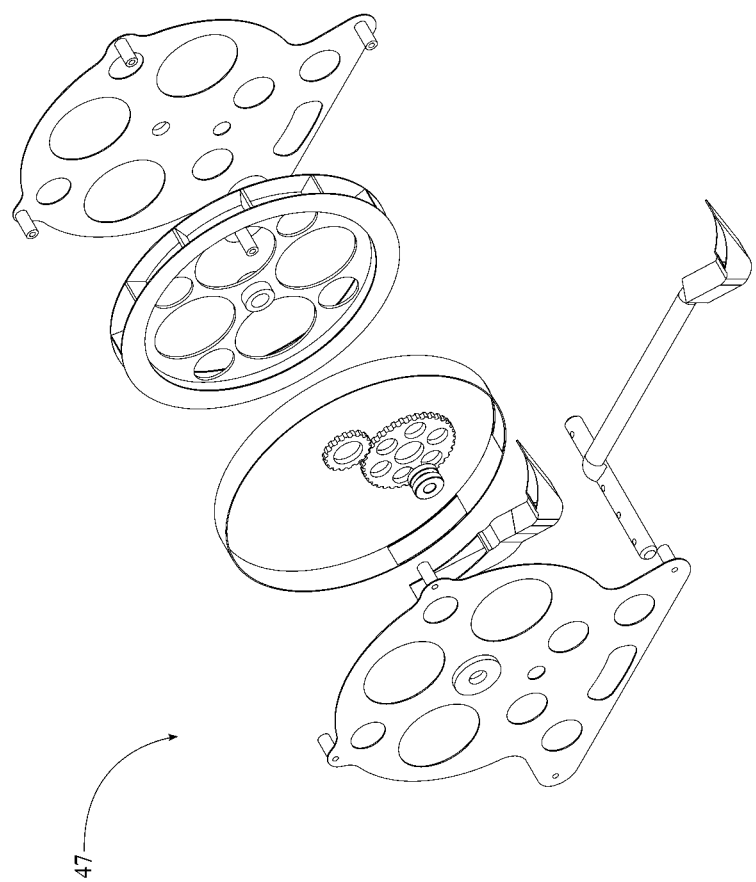
FIG. 20 is a perspective exploded view of the accelerator unit of the CAT unit of the present invention.

In reference to FIG. 7, FIG. 8, and FIG. 9, the first AGES unit 8 and the second AGES unit 9, that cleans the heavy particles mixture and the light particle mixture in order to produce clean fluid, each comprise a holding chamber 31, a chamber opening 32, a plurality of release valves 33, an outer collector 34, a particle discharge duct 36, a fluid discharge duct 37, a base unit 38, a drive shaft 39, and a support stand 40. More specifically, the holding chamber 31 rotation of the first AGES unit 8 and the second AGES unit 9 create centrifugal force in such a way that the centrifugal force separates heavy and light particles according to weight so that the heavy and light particle can be removed from the heavy particle mixture and the light particle mixture. The chamber opening 32 is concentrically positioned on the holding chamber 31 so that the holding chamber 31 is able to receive the heavy particle mixture and the light particle mixture from the first PAT unit 2 and the second PAT unit 3. The outer collector 34 is adjacently connected around the holding chamber 31, where the discharge slot 35 is perimetrically and internally positioned within the outer collector 34. The plurality of release valves 33 is in fluid communication with the holding chamber 31 and the outer collector 34 through the discharge slot 35 so that the heavy and light particles can be collected within the discharge slot 35 as they are released through the plurality of release valves 33. The particle discharge duct 36 is externally connected to the outer collector 34 in such a way that the particle discharge duct 36 is in fluid communication with the discharge slot 35. As a result, the particle discharge duct 36 is able to remove the heavy and light particles from the outer collector 34. The support stand 40 is externally connected to the outer collector 34 opposite of the chamber opening 32 and connected to the base unit 38 opposite of the holding chamber 31. More specifically, the base unit 38 is concentrically positioned below the holding chamber 31 as the support stand 40 provides a fixed anchor for the base unit 38 and holding chamber 31. The drive shaft 39 is concentrically positioned in between the base unit 38 and the holding chamber 31 and connected with the holding chamber 31 so that the drive shaft 39 is able to provide rotational motive force for the holding chamber 31 according to the system specification. In other words, the drive shaft 39 functions as the rotating mechanism of the present invention as the drive shaft 39 creates centrifugal force required to separate the heavy and light particles.

Since the first PAT unit 2 is in fluid communication with the first CAP unit 4, the first AGES unit 8 is in fluid communication with the first PAT unit 2, and the first CAP unit 4 is in fluid communication with the CAT unit 10, the present invention is able to carry out the first phase of the purifying process and electricity generating processes as the exhaust gas travels from the external exhaust outlet 1 to the CAT unit 10.

The external exhaust outlet 1 is in fluid communication with the first tower inlet 12 of the first PAT unit 2 so that the exhaust gas can flow into the first PAT unit 2. Additionally, the fluid discharge duct 37 of the first AGES unit 8 is in fluid communication with the second tower inlet 13 of the first PAT unit 2 in order to supply clean fluid from the first AGES unit 8. Then the exhaust fluid mixture is created with the exhaust gas of the external exhaust outlet 1 and the clean fluid of the first AGES unit 8 so that the temperature of the exhaust gas can be decreased to form the light particle mixture and the heavy particle mixture within the vessel 11. The heavy particle outlet 14 and the light particle outlet 15 of the first PAT unit 2 are in fluid communication with the holding chamber 31 of the first AGES unit 8 through the chamber opening 32 of the first AGES unit 8. As a result, the first AGES unit 8 respectively receives the light particle mixture and the heavy particle mixture through the light particle outlet 15 and heavy particle outlet 14 of the first PAT unit 2. Then the first AGES unit 8 is able to separates the heavy and light particles away from the holding chamber 31 so that clean fluid can be supplied back to the second tower inlet 13 of the first PAT unit 2 through the fluid discharge duct 37 of the first AGES unit 8.

When the holding chamber 31 of the first AGES unit 8 is filled with the heavy particle mixture and the light particle mixture, the holding chamber 31 of the first AGES unit 8 is rotated for a period of time by the drive shaft 39 of the first AGES unit 8 so that the heavy particles can be collected adjacent to the plurality of release valves 33 of the first AGES unit 8 while the light particles are collected toward the center of the holding chamber 31 of the first AGES unit 8. With the activation of the plurality of release valves 33 of the first AGES unit 8, the heavy particles are released into the discharge slot 35 of the first AGES unit 8. Then the plurality of release valves 33 of the first AGES unit 8 is momentarily closed to allow the complete discharge of the heavy particles through the particle discharge duct 36 of the first AGES unit 8. The continuous rotation of the holding chamber 31 of the first AGES unit 8 allows the light particles to collect next to the plurality of release valves 33. Then the plurality of release valves 33 of the first AGES unit 8 is re-opened to release the light particles, where the light particles flow the same path as did the heavy particles. Then the holding chamber 31 of the first AGES unit 8 is left with clean fluid which can be resupplied back to the first PAT unit 2. The first AGES unit 8 continuously operates within the present invention along with the efficient time intervals so that the first PAT unit 2 is continuously able to clean the exhaust gas mixture.

The tower outlet 16 of the first PAT unit 2 is in fluid communication with the tank inlet 22 and the inlet valve 25 of the first CAP unit 4 so that particle free exhaust gas can be discharged into the first CAP unit 4. Once the particle free exhaust gas enters into the first CAP unit 4 through the opened-position of the inlet valve 25 of the first CAP unit 4, the internal pressure within the first CAP unit 4 increase as the first outlet valve 26 and the second outlet valve 27 of the first CAP unit 4 are in the closed-position. When the internal pressure increases, particle free exhaust gas becomes liquid at the liquidation pressure of the carbon dioxide. The precipitator outlet 23 of the first CAP unit 4 is in fluid communication with at least one first lift tower 6 so that the liquid carbon dioxide can be discharged into the at least one first lift tower 6 through the second outlet valve 27. More specifically, the liquid carbon dioxide flows into the at least one first lift tower 6 as the second outlet valve 27 of the first CAP unit 4 is switched into the opened-position. Since the tank outlet 24 of the first CAP unit 4 is in fluid communication with the a combustion exhaust inlet 41 of the CAT unit 10, the remaining exhaust gas exists through the first outlet valve 26 and tank outlet 24 of the first CAP unit 4 into the combustion exhaust inlet 41 along with the simultaneously release of liquid carbon dioxide.

The CAT unit 10 is a series of air purifying units as each unit provides a unique functionality to the CAT unit 10. In reference to FIG. 10-25, the CAT unit 10 comprises a plurality of turbine units 42, a heat collector unit 50, a combustion unit 55, an electrolysis unit 59, and an interconnected lift tower system 66 as the plurality of turbine units 42 comprises an impeller segment unit 43, a hydrogen turbine unit 44, an impeller-accelerator unit 45, a steam turbine unit 46, an accelerator unit 47, a drive axle 49, and a turbine generator 48. Each of the plurality of turbine units 42, which comprises a first opening, a second opening, an inner-turbine, a first gear, and a second gear, is engaged with one another as the rotational speed of the inner-turbine increases along the plurality of turbine units 42. Additionally, the rotational energy is transferred from one of the plurality of turbine units 42 to another as the drive axle 49 is rotatably engaged with the impeller segment unit 43, the hydrogen turbine unit 44, the impeller-accelerator unit 45, the steam turbine unit 46, the accelerator unit 47, and the turbine generator 48 through the first gear and the second gear of the plurality of turbine units 42. As a result, the turbine generator 48 is able to harvest the transferred rotational energy to generate electricity within the present invention.

Figure 1B:
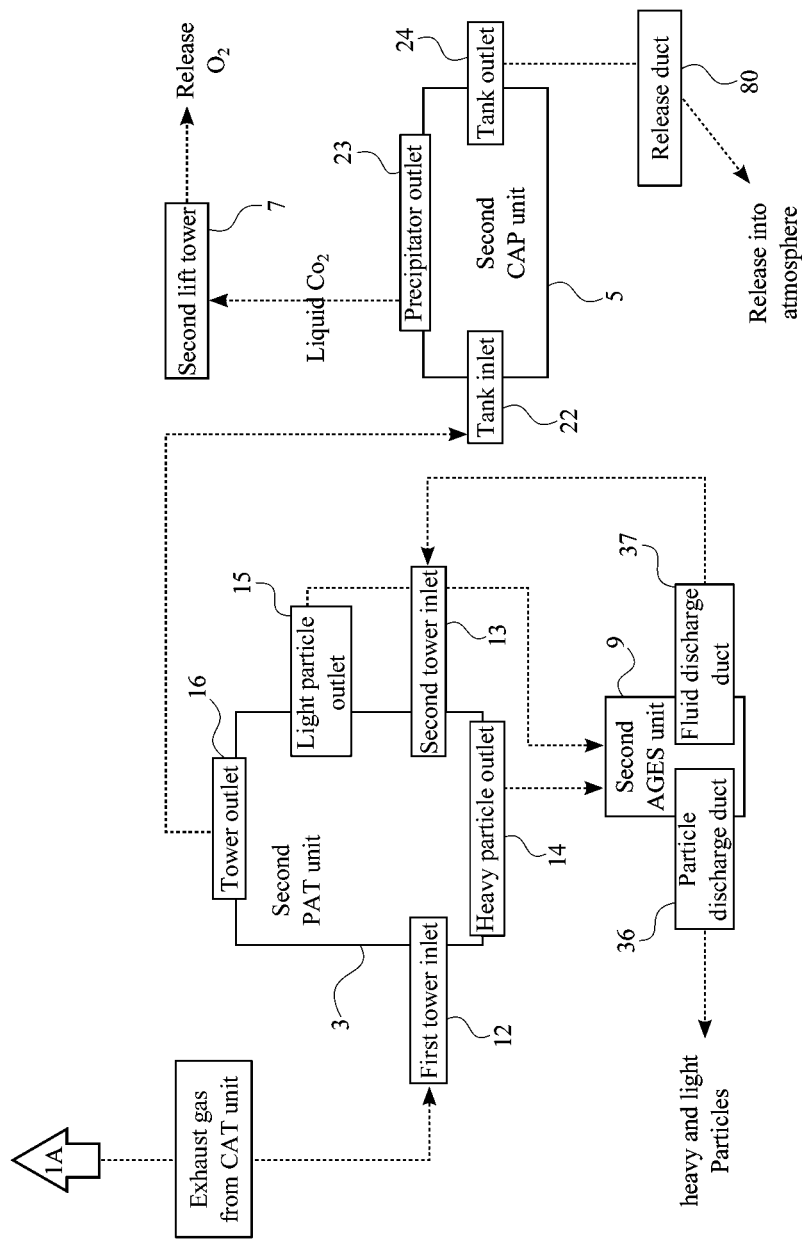
FIG. 1B is a basic flowchart illustrating the second half of the overall method of the present invention, wherein the first half is shown in FIG. 1A.

The impeller segment unit 43, which harnesses the rotational speed of the exhaust gas from the first CAP unit 4, is in fluid communication with the combustion exhaust inlet 41 as shown in FIG. 1B. In reference to FIG. 11 and FIG. 12, the exhaust gas is entered into a turbine chamber of the inner-turbine through the first opening of the impeller segment unit 43. Then the turbine chamber of the impeller segment unit 43 with the exhaust gas is able to rotate around the drive axle 49 and forces the exhaust gas out through the second opening of the impeller segment unit 43, using speed and centrifugal force. Then the exhaust gas is able to travel into the hydrogen turbine unit 44 as the impeller segment unit 43 is in fluid communication with the hydrogen turbine unit 44. When the drive axle 49 is rotated along with the inner-turbine of the impeller segment unit 43, the first gear that is attached to the inner-turbine of the impeller segment unit 43 increases the rotation speed of the second gear. The second gear of the impeller segment unit 43 is attached with an idler driver so that the idler driver is able transfer the rotational speed from the second gear of the impeller segment unit 43 to the hydrogen turbine unit 44.

The hydrogen turbine unit 44 increases the speed of the exhaust gas as the exhaust gas travels through the hydrogen turbine unit 44. In reference to FIG. 13 and FIG. 14, the exhaust gas from the impeller segment unit 43 enters into a turbine chamber of the inner-turbine through the first opening of the hydrogen turbine unit 44. Then the turbine chamber of the hydrogen turbine unit 44 with the exhaust gas is able to rotate around the drive axle 49 and forces the exhaust gas out through an orifice of the hydrogen turbine unit 44, using speed and centrifugal force. Then the exhaust gas is enters into a combustion tube of the hydrogen turbine unit 44 since the combustion tube forms a vacuum from the last combustion event. This vacuum now pulls the exhaust gas into the combustion tube, where the exhaust gas mixes with hydrogen and oxygen gases that are discharged from the electrolysis unit 59 while a spark from the combustion unit 55 ignites the new mixture within the combustion tube to create a burst of energy.

Figure 23:
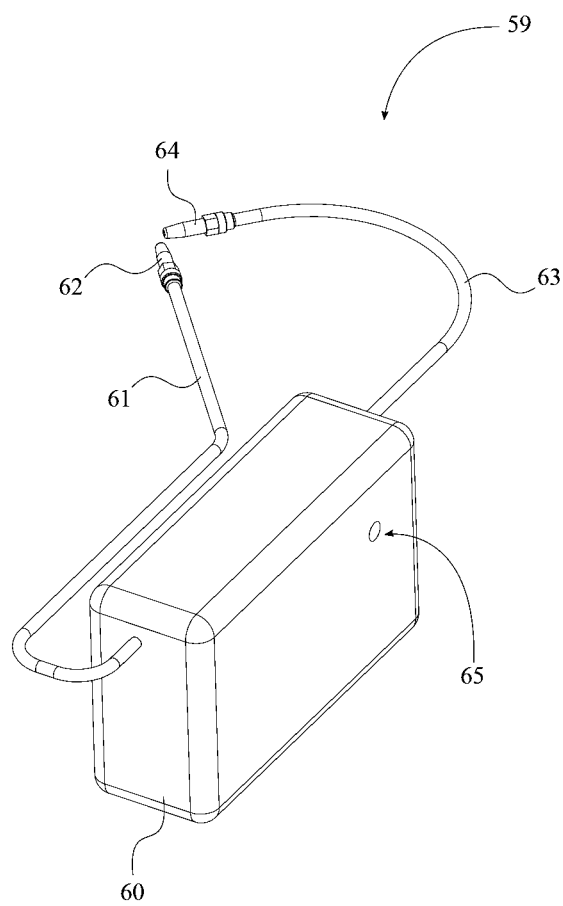
FIG. 23 is a perspective view of the electrolysis unit of the present invention.

The electrolysis unit 59, which produces hydrogen and oxygen from water, comprises a separator tank 60, a hydrogen outlet 61, a hydrogen injector 62, an oxygen outlet 63, an oxygen injector 64, and a water inlet 65 as shown in FIG. 23. For the proper functionality of the electrolysis unit 59, the hydrogen outlet 61 and the oxygen outlet 63 are in fluid communication with the separator tank 60 as the water inlet 65 is positioned on the separator tank 60. The water inlet 65 is connected with an external water source so that water can continuously be supplied to the separator tank 60 in order to isolate hydrogen and oxygen. The hydrogen outlet 61 is in fluid communication with the hydrogen injector 62 while the hydrogen injector 62 traverses into the combustion tube so that hydrogen outlet 61 can be in fluid communication with the hydrogen turbine unit 44. Similarly, the oxygen outlet 63 is in fluid communication with the oxygen injector 64 while the oxygen injector 64 traverses into the combustion tube so that oxygen outlet 63 can be in fluid communication with the hydrogen turbine unit 44. As a result, the electrolysis unit 59 is able to supply hydrogen to the hydrogen injector 62 via the hydrogen outlet 61 and oxygen to the oxygen injector 64 via the oxygen outlet 63 as hydrogen and oxygen get discharged into the combustion tube. Optionally, the present invention may also use pressurized canisters of hydrogen and oxygen in place of the electrolysis unit 59.

Figure 22:
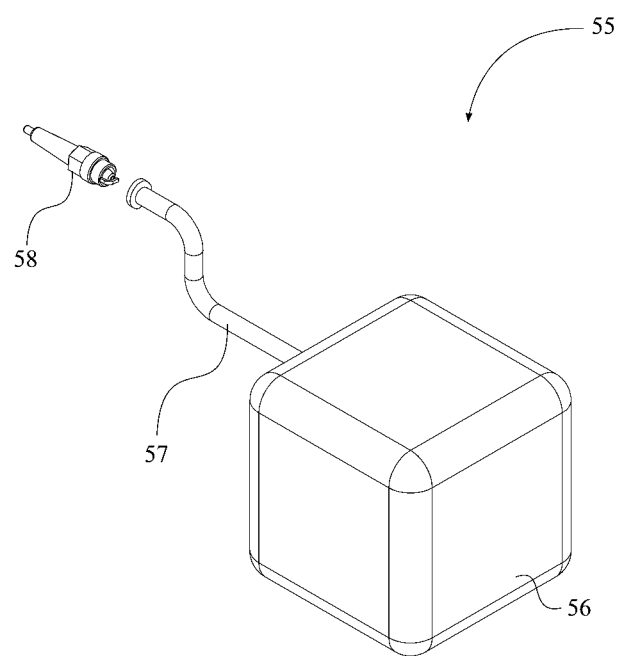
FIG. 22 is a perspective exploded view of the combustion unit of the present invention.

The combustion unit 55, which creates the necessary spark for the combustion tube, comprises a controller unit 56, a spark plug wire 57, and a spark plug 58 as shown in FIG. 22. The controller unit 56 controls all electrical interfaces and provides the spark for combustion while the spark plug wire 57 is the conductor between controller unit 56 and spark plug 58. More specifically, the spark plug wire 57 is electrically connected between the controller unit 56 and the spark plug 58 as the spark plug 58 is traversed into the combustion tube. Once the spark is created by the spark plug 58, the energy burst from the combustion of hydrogen and oxygen mix ignites any unburned exhaust carbon mono oxide and other vapors of the exhaust gas. The burst also promotes the inner-turbine of the hydrogen turbine unit 44 to rotate in such a way the exhaust gas is able to discharge into the impeller-accelerator unit 45 through the second opening of the hydrogen turbine unit 44 as the hydrogen turbine unit 44 is in fluid communication with the impeller-accelerator unit 45. When the drive axle 49 is rotated along with the inner-turbine of the hydrogen turbine unit 44, the first gear that is attached to the inner-turbine of the hydrogen turbine unit 44 increases the rotation speed of the second gear. The second gear of the hydrogen turbine unit 44 is attached with an idler driver so that the idler driver is able transfer the rotational speed from the second gear of the hydrogen turbine unit 44 to the impeller-accelerator unit 45.

The impeller-accelerator unit 45 increases the speed of the exhaust gas as the exhaust gas travels through the impeller-accelerator unit 45. In reference to FIG. 15 and FIG. 16, the exhaust gas from the hydrogen turbine unit 44 enters into a turbine chamber of the inner-turbine through the first opening of the impeller-accelerator unit 45. Then the turbine chamber of the impeller-accelerator unit 45 with the exhaust gas is able to rotate around the drive axle 49 and forces the exhaust gas out through the second opening of the impeller-accelerator unit 45, using speed and centrifugal force. The turbine chamber of the impeller-accelerator unit 45 increases the rotational velocities produce due a negative pressure at the first opening of the impeller-accelerator unit 45 and a positive pressure at the second opening of the impeller-accelerator unit 45. As a result, the exhaust gas continuously flows through the impeller-accelerator unit 45 to the steam turbine unit 46 as the impeller-accelerator unit 45 is in fluid communication with the steam turbine unit 46. When the drive axle 49 is rotated along with the inner-turbine of the impeller-accelerator unit 45, the first gear that is attached to the inner-turbine of the impeller-accelerator unit 45 increases the rotation speed of the second gear. The second gear of the impeller-accelerator unit 45 is attached with an idler driver so that the idler driver is able transfer the rotational speed from the second gear of the impeller-accelerator unit 45 to the steam turbine unit 46.

High pressure steam from the heat collector unit 50 is applied to the steam turbine unit 46 so that the exhaust gas can be accelerated within the steam turbine unit 46 as it flows from the impeller-accelerator unit 45. In reference to FIG. 17 and FIG. 18, the exhaust gas from the impeller-accelerator unit 45 enters into a turbine chamber of the inner-turbine through the first opening of the steam turbine unit 46. Then the turbine chamber of the steam turbine unit 46 with the exhaust gas is able to rotate around the drive axle 49 and forces the exhaust gas out through an orifice of the steam turbine unit 46, using speed and centrifugal force. Then the exhaust gas is deposited into a steam expansion tube of the steam turbine unit 46 as high pressure steam from the heat collector unit 50 propels the exhaust gas, increasing the rotational speed of the inner-turbine. Then the exhaust gas is able to exist into the accelerator unit 47 through the second opening of the steam turbine unit 46 as the accelerator unit 47 is in fluid communication with the steam turbine unit 46. When the drive axle 49 is rotated along with the inner-turbine of the steam turbine unit 46, the first gear that is attached to the inner-turbine of the steam turbine unit 46 increases the rotation speed of the second gear. The second gear of the steam turbine unit 46 is attached with an idler driver so that the idler driver is able transfer the rotational speed from the second gear of the steam turbine unit 46 to the accelerator unit 47.

Figure 21:
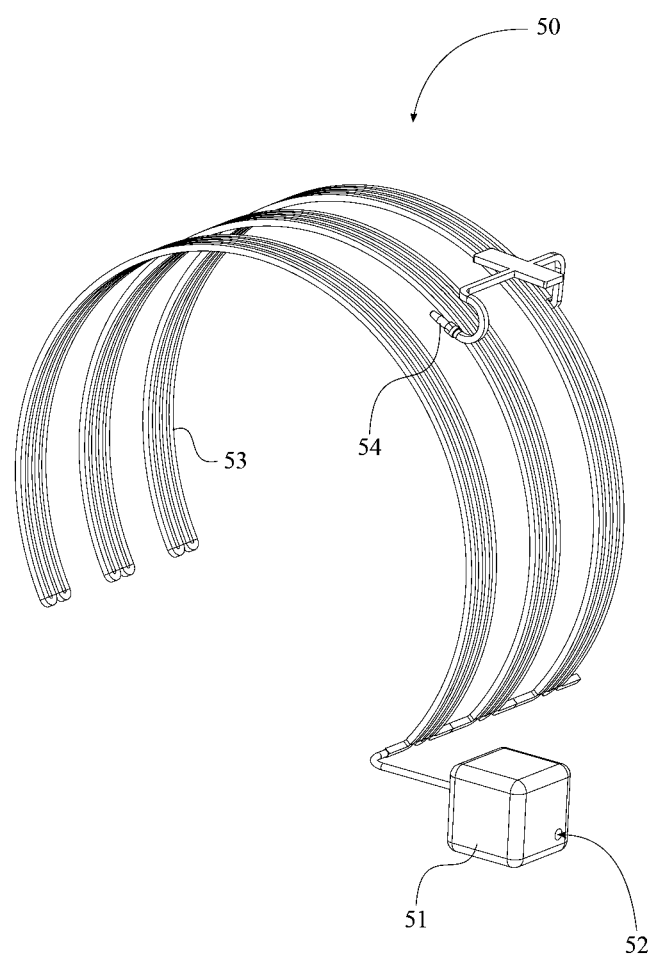
FIG. 21 is a perspective view of the heat collector unit of the present invention.

The heat collector unit 50, which discharges high pressure steam to the steam turbine unit 46, comprises a pump 51, a water orifice 52, a heat collecting tube 53, and a steam ejector 54 as shown in FIG. 21. A continuous flow of water is entered into the heat collector unit 50 through the water orifice 52 as the water orifice 52 is positioned on the pump 51. The heat collecting tube 53 is in fluid communication with the pump 51 so that water can be discharged into the heat collecting tube 53 from the pump 51. When water is entered into the heat collecting tube 53, the temperature of water increases as heat energy is transferred into the captive water within the heat collecting tube 53, creating high pressure steam. More specifically, the heat collecting tube 53 is perimetrically positioned around the impeller segment unit 43, the hydrogen turbine unit 44, the impeller-accelerator unit 45, the steam turbine unit 46, and the accelerator unit 47 so that the heat energy can be drawn from those components to the captive water within the heat collecting tube 53. Then the captive water within the heat collecting tube 53 goes through a phase change due to the increasing temperature and becomes high pressure steam. The steam ejector 54 is in fluid communication with the heat collecting tube 53 and steam turbine unit 46 and positioned opposite of the pump 51. Due to the positioning of the steam ejector 54, high pressure steam can be ejected into the steam expansion tube in order to increase the rotational speed for the inner-turbine of the steam turbine. Simultaneously, the heat collector unit 50 functions as a cooling system for the plurality of turbine units 42 as the heat energy is drawn away from the plurality of turbine units 42 to maintain an optimal operating temperature.

The accelerator unit 47 increases the speed of the exhaust gas as the exhaust gas travels through the accelerator unit 47. In reference to FIG. 19 and FIG. 20, the exhaust gas from the steam turbine unit 46 enters into a turbine chamber of the inner-turbine through the first opening of the accelerator unit 47. Then the turbine chamber of the accelerator unit 47 with the exhaust gas is able to rotate around the drive axle 49 and forces the exhaust gas out through the second opening of the accelerator unit 47, using speed and centrifugal force. Then the exhaust gas is discharged into the interconnected lift tower system 66 as the accelerator unit 47 is in fluid communication with the interconnected lift tower system 66. When the drive axle 49 is rotated along with the inner-turbine of the accelerator unit 47, the first gear that is attached to the inner-turbine of the accelerator unit 47 increases the rotation speed of the second gear. The second gear of the accelerator unit 47 is engaged with the turbine generator 48 so that the turbine generator 48 is able covert the rotational energy of the second gear into production of electrical power or mechanical power while the exhaust gas is continuously discharged into the interconnected lift tower system 66.

The interconnected lift tower system 66 further purifies the exhaust gas as the exhaust gas is traveled through the interconnected lift tower system 66 while creating electricity. The interconnected lift tower system 66 comprises at least one tower 67, an outlet duct 73, and a tower generator 74, where the at least one tower 67 can comprise additional towers to accommodate for larger system. In reference to the general configuration of the interconnected lift tower system 66, the at least one tower 67 is in fluid communication with the accelerator unit 47 so that the exhaust gas from the accelerator unit 47 can be discharged into the interconnected lift tower system 66. The outlet duct 73 is in fluid communication with the at least one tower 67 opposite of the accelerator unit 47 while the tower generator 74 is engaged with the at least one tower 67.

Figure 24:
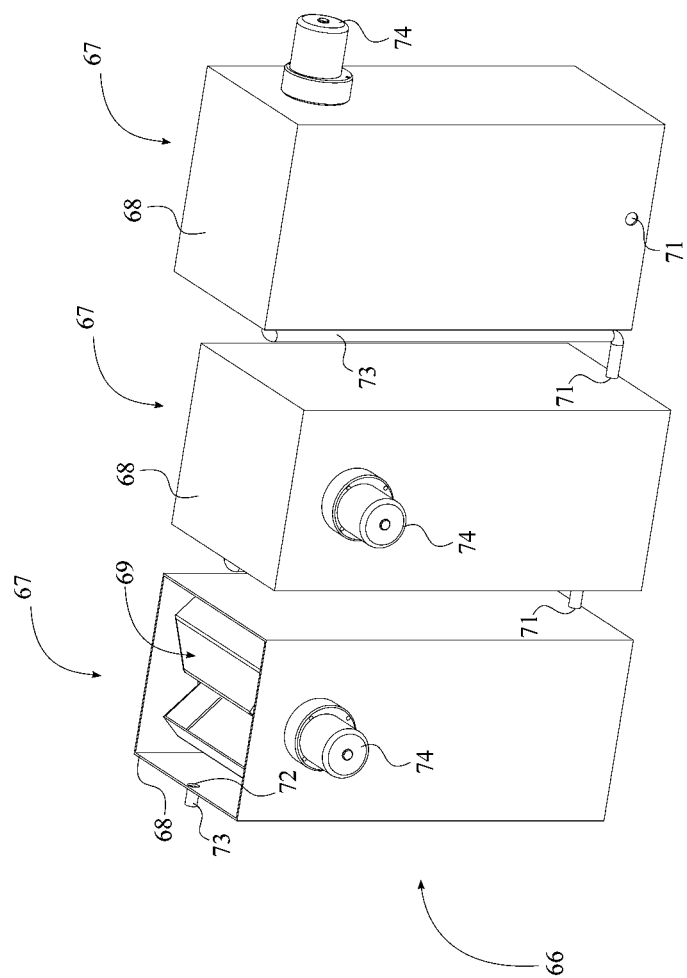
FIG. 24 is a perspective view of the interconnected lift tower system of the present invention.
Figure 25:
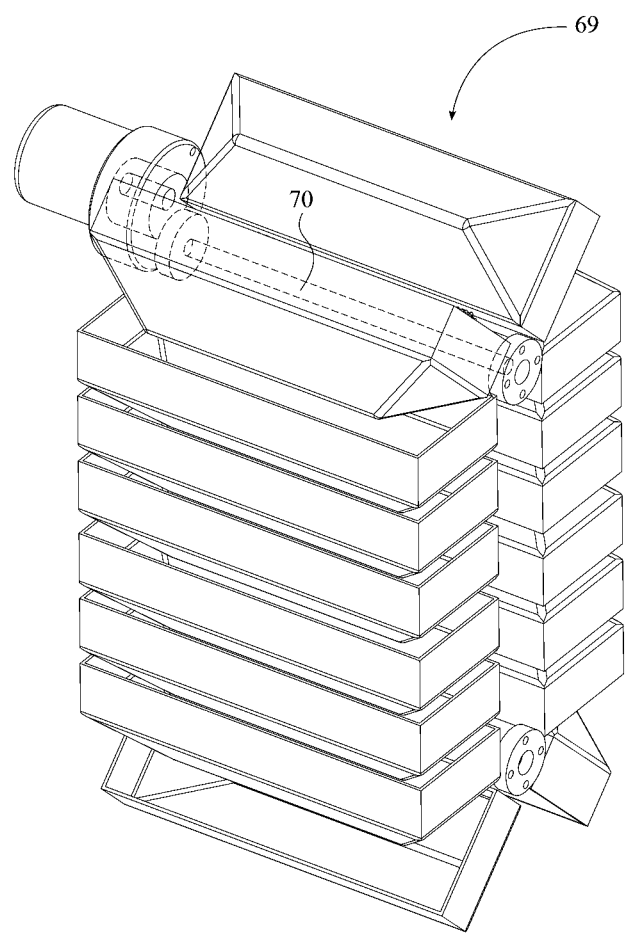
FIG. 25 is a perspective view of the multi plenum conveyor system of the present invention.

In reference to FIG. 24 and FIG. 25, the at least one tower 67 comprises a housing 68, a multi plenum conveyor system 69, a rotor shaft 70, a lift tower inlet 71, and a lift tower outlet 72 so that the at least one tower 67 is able to interact with the outlet duct 73 and the tower generator 74. More specifically, the multi plenum conveyor system 69 is internally positioned within the housing 68 and connected to the housing 68 through the rotor shaft 70. The tower generator 74 is axially connected with the rotor shaft 70 so that the multi plenum conveyor system 69 and the rotor shaft 70 are able to power the tower generator 74. The lift tower inlet 71 is traversed through the housing 68 in order to accept an outlet of the accelerator unit 47. In other words, the lift tower inlet 71 is in fluid communication with the accelerator unit 47 so that the exhaust gas can be discharged into the housing 68. The lift tower outlet 72 is also traversed through the housing 68 so that the outlet duct 73 can be in fluid communication with the housing 68. The outlet duct 73 is positioned atop the multi plenum conveyor system 69 while the lift tower inlet 71 is oppositely positioned of the lift tower outlet 72, across the multi plenum conveyor system 69.

When the exhaust gas is discharged from the accelerator unit 47, the exhaust gas is discharged into a body of water contained within the housing 68. The steam in the exhaust gas condenses into water and the remaining exhaust gas is collected in a lower plenum of the multi plenum conveyor system 69 as the lift tower inlet 71 is positioned below the multi plenum conveyor system 69 that includes multiple plenums.

The captured exhaust gas in the lower plenum displaces the water within the lower plenum and lift is created within the multi plenum conveyor system 69. Since the lower plenum is attached to a conveyor system of the multi plenum conveyor system 69 and rotates the rotor shaft 70 and applies force to the tower generator 74, the tower generator 74 is able to create electrical power or a mechanical take off. Since multiple plenums are attached to the conveyor system and only the lower plenum is filled with the exhaust gas, the multi plenum conveyor system 69 begins its upward movement while an adjacent plenum to the lower plenum is moves downward so that the exhaust gas can be filled. This cascade effect may be duplicated additional times until the delta pressure of the exhaust gas is not overcome the head of water pressure. When an exhaust gas filled plenum reaches above the rotor shaft 70, the exhaust gas is displaced by the water and the descending cycle of the plenum begins forming a continuous moving loop. As a result of the continuous moving loop, the tower generator 74 is able to continuously generate electricity within the present invention. The exhaust gas now at the top of the at least tower is still under pressure and starts its exit through the outlet duct 73.

The at least one tower 67 maintains a lower temperature and it may be used to support aquatic life for $CO_2$ reduction. The at least one tower 67 along with additional towers in series configuration that receive the exhaust gas can be discharged into the atmosphere or a closed in green house to reduce the $CO_2$ and promote plant growth. The solid particulates formed in the water within the housing 68 may be used as food and soil enrichment. If the source has environmental hazard, the solid particulates they may formed within the housing 68 is filtered out and disposed of accordingly.

In reference to FIG. 1B, the outlet duct 73 is in fluid communication with the first tower inlet 12 of the second PAT unit 3 so that the exhaust gas can flow into the second PAT unit 3. Additionally, the fluid discharge duct 37 of the second AGES unit 9 is in fluid communication with the second tower inlet 13 of the second PAT unit 3. Then the exhaust fluid mixture is created within the vessel 11 so that the temperature of the exhaust gas can be decreased to form the light particle mixture and the heavy particle mixture once again. The heavy particle outlet 14 and the light particle outlet 15 of the second PAT unit 3 are in fluid communication with the holding chamber 31 of the second AGES unit 9 through the chamber opening 32 of the second AGES unit 9. As a result, the second AGES unit 9 receives the light particle mixture and the heavy particle mixture through the light particle outlet 15 and heavy particle outlet 14 of the second PAT unit 3 respectively. Then the second AGES unit 9 is able to separates the heavy and light particles away from the holding chamber 31 so that clean fluid can be supplied back to the second tower inlet 13 of the second PAT unit 3 through the fluid discharge duct 37 of the second AGES unit 9. The second PAT unit 3 and the second AGES unit 9 implement the same functionality as the first PAT unit 2 and the first AGES unit 8 respectively. The tower outlet 16 of the second PAT unit 3 is in fluid communication with the tank inlet 22 and the inlet valve 25 of the second CAP unit 5 so that particle free exhaust gas can be discharged into the second CAP unit 5. Once the particle free exhaust gas enters into the second CAP unit 5 through the opened-position of the inlet valve 25 of the second CAP unit 5, the second CAP unit 5 functions similar to the first CAP unit 4, where the liquid carbon dioxide flows into at least one second lift tower 7 as the precipitator outlet 23 of the second CAP unit 5 is in fluid communication with at least one second lift tower 7. However, the remaining exhaust gas is existed from the present invention into the atmosphere as the tank outlet 24 of the second CAP unit 5 is in fluid communication with a release duct 80.

Although the invention has been explained in relation to its preferred embodiment, it is to be understood that many other possible modifications and variations can be made without departing from the spirit and scope of the invention as hereinafter claimed.

What is claimed is:

1. A mitigating system to remove contaminants from an exhaust gas and generate electrical power comprises:
    a first particle acquisition tower (PAT) unit;
    a first carbon dioxide precipitator (CAP) unit;
    a clean air turbine (CAT) unit;
    a first artificial gravity enhance separator (AGES) unit;
    the first PAT unit comprises a first tower inlet, a second tower inlet, a heavy particle outlet, a light particle outlet, and a tower outlet;
    the first CAP unit comprises a tank inlet, a tank outlet, and a precipitator outlet;
    the CAT unit comprises a combustion exhaust inlet, a plurality of turbine units, a heat collector unit, a combustion unit, an electrolysis unit, and an interconnected lift tower system;
    the first AGES unit comprises a chamber opening and a fluid discharge duct;
    an external exhaust outlet being in fluid communication with the first PAT unit, wherein the external exhaust outlet emits an exhaust gas;
    the first PAT unit being in fluid communication with the first CAP unit;
    the first AGES unit being in fluid communication with the first PAT unit; and
    the first CAP unit being in fluid communication with the CAT unit.

2. The mitigating system to remove containments from an exhaust gas and generate electrical power as claimed in claim 1 comprises:
    a second particle acquisition tower (PAT) unit;
    a second artificial gravity enhance separator (AGES) unit;
    the second PAT unit comprises a first tower inlet, a second tower inlet, a heavy particle outlet, a light particle outlet, and a tower outlet;
    the second AGES unit comprises a chamber opening and a fluid discharge duct;
    the CAT unit being in fluid communication with the second PAT unit; and
    the second AGES unit being in fluid communication with the second PAT unit.

3. The mitigating system to remove containments from an exhaust gas and generate electrical power as claimed in claim 2 comprises:
    an outlet duct of the interconnected lift tower system being in fluid communication with the first tower inlet of the second PAT unit;
    the heavy particle outlet and the light particle outlet of the second PAT unit being in fluid communication with the holding chamber of the second AGES unit through the chamber opening of the second AGES unit; and
    the fluid discharge duct of the second AGES unit being in fluid communication with the second tower inlet of the second PAT unit.

4. The mitigating system to remove containments from an exhaust gas and generate electrical power as claimed in claim 1 comprises:
    a second carbon dioxide precipitator (CAP) unit;
    the second CAP unit comprises a tank inlet, a tank outlet, and a precipitator outlet; and
    the second CAP unit being in fluid communication with a second PAT unit.

5. The mitigating system to remove containments from an exhaust gas and generate electrical power as claimed in claim 4 comprises:
    the tower outlet of the second PAT unit being in fluid communication with the tank inlet of the second CAP unit;
    the precipitator outlet of the second CAP unit being in fluid communication with at least one second lift tower; and
    the tank outlet of the second CAP unit being in fluid communication with a release duct.

6. The mitigating system to remove contaminants from an exhaust gas and generate electrical power as claimed in claim 1 comprises:
    the first PAT unit and a second PAT unit each further comprise a vessel and a plurality of control baffles;
    the first tower inlet, the second tower inlet, the heavy particle outlet, the light particle outlet, and the tower outlet being in fluid communication with the vessel;
    the plurality of control baffles being internally connected along the vessel;
    each of the plurality of control baffles being evenly distributed along the vessel;
    the heavy particle outlet and the tower outlet being oppositely positioned from each other across the vessel;

the first tower inlet and the second tower inlet being adjacently positioned with a first outer baffle of the plurality of control baffles and the heavy particle outlet; and the light particle outlet being adjacently positioned with a second outer baffle of the plurality of control baffles and the tower outlet.

7. The mitigating system to remove contaminants from an exhaust gas and generate electrical power as claimed in claim 1 comprises:

the first CAP unit and a second CAP unit each further comprise a storage tank, an inlet valve, a first outlet valve, and a second outlet valve;

the tank inlet being in fluid communication with the storage tank through the inlet valve;

the tank outlet being in fluid communication with the storage tank through the first outlet valve;

the tank inlet and the tank outlet being oppositely positioned each other across the storage tank;

the precipitator outlet being in fluid communication with the storage tank through the second outlet valve; and the precipitator outlet being positioned in between the tank inlet and the tank outlet.

8. The mitigating system to remove contaminants from an exhaust gas and generate electrical power as claimed in claim 1 comprises:

the first AGES unit further and a second AGES unit each comprise a holding chamber, a plurality of release valves, an outer collector, a discharge slot, a particle discharge duct, a base unit, a drive shaft, and a support stand;

the chamber opening being concentrically positioned on the holding chamber;

the outer collector being adjacently connected around the holding chamber;

the discharge slot being perimetrically and internally positioned within the outer collector;

the plurality of release valves being in fluid communication with the holding chamber and the outer collector through the discharge slot;

the particle discharge duct being externally connected to the outer collector;

the particle discharge duct being in fluid communication with the discharge slot;

the support stand being externally connected to the outer collector opposite of the chamber opening;

the base unit being connected to the support stand opposite of the holding chamber;

the drive shaft being concentrically positioned in between the base unit and the holding chamber; and the drive shaft being connected to the holding chamber, wherein the drive shaft rotates the holding chamber.

9. The mitigating system to remove contaminants from an exhaust gas and generate electrical power as claimed in claim 1 comprises:

the external exhaust outlet being in fluid communication with the first tower inlet of the first PAT unit;

the tower outlet of the first PAT unit being in fluid communication with the tank inlet of the first CAP unit;

the heavy particle outlet and the light particle outlet of the first PAT unit being in fluid communication with the holding chamber of the first AGES unit through the chamber opening of the first AGES unit; and the fluid discharge duct of the first AGES unit being in fluid communication with the second tower inlet of the first PAT unit.

10. The mitigating system to remove contaminants from an exhaust gas and generate electrical power as claimed in claim 1 comprises:

the precipitator outlet of the first CAP unit being in fluid communication with at least one first lift tower; and the tank outlet of the first CAP unit being in fluid communication with the combustion exhaust inlet.

11. The mitigating system to remove contaminants from an exhaust gas and generate electrical power as claimed in claim 1 comprises:

the plurality of turbine units comprises an impeller segment unit, a hydrogen turbine unit, an impeller-accelerator unit, a steam turbine unit, an accelerator unit, a drive axle, and a turbine generator;

the combustion exhaust inlet being in fluid communication with the impeller segment unit;

the impeller segment unit being in fluid communication with the hydrogen turbine unit;

the hydrogen turbine unit being in fluid communication with the impeller-accelerator unit;

the impeller-accelerator unit being in fluid communication with the steam turbine unit;

the steam turbine unit being in fluid communication with the accelerator unit;

the accelerator unit being in fluid communication with the interconnected lift tower system; and the drive axle being rotatably engaged with the impeller segment unit, the hydrogen turbine unit, the impeller-accelerator unit, the steam turbine unit, the accelerator unit, and the turbine generator.

12. The mitigating system to remove contaminants from an exhaust gas and generate electrical power as claimed in claim 1 comprises:

the heat collector unit comprises a pump, a water orifice, a heat collecting tube, a steam ejector;

the water orifice being positioned on the pump;

the heat collecting tube being in fluid communication with the pump;

the steam ejector being in fluid communication between the heat collecting tube and a steam turbine unit of the plurality of turbine units, opposite of the pump; and the heat collecting tube being perimetrically positioned around an impeller segment unit, a hydrogen turbine unit, an impeller-accelerator unit, a steam turbine unit, and an accelerator unit of the plurality of turbine units.

13. The mitigating system to remove contaminants from an exhaust gas and generate electrical power as claimed in claim 1 comprises:

the combustion unit comprises a controller unit, a spark plug wire, and a spark plug;

the spark plug being electrically connected with the controller unit through the spark plug wire; and the spark plug traversing into a hydrogen turbine unit of the plurality of turbine units.

14. The mitigating system to remove contaminants from an exhaust gas and generate electrical power as claimed in claim 13 comprises:

the at least one tower comprises a housing, a multi plenum conveyor system, a rotor shaft, a lift tower inlet, and a lift tower outlet;

the multi plenum conveyor system being internally connected to the housing through the rotor shaft;

the tower generator being axially connected with the rotor shaft;

the lift tower inlet and the lift tower outlet traversing through the housing;

the outlet duct being in fluid communication with the housing through the lift tower outlet;

the outlet duct being positioned atop the multi plenum conveyor system;

the lift tower inlet being in fluid communication with the accelerator unit; and the lift tower inlet being oppositely positioned of the lift tower outlet across the multi plenum conveyor system.

15. The mitigating system to remove contaminants from an exhaust gas and generate electrical power as claimed in claim 1 comprises:

the electrolysis unit comprises a separator tank, a hydrogen outlet, a hydrogen injector, an oxygen injector, an oxygen injector, and a water inlet;

the hydrogen outlet and the oxygen outlet being in fluid communication with the separator tank;

the water inlet being positioned on the separator tank;

the hydrogen outlet being in fluid communication with a hydrogen turbine unit of the plurality of turbine units through the hydrogen injector; and the oxygen outlet being in fluid communication with the hydrogen turbine unit through the oxygen injector.

16. The mitigating system to remove contaminants from an exhaust gas and generate electrical power as claimed in claim 1 comprises:

the interconnected lift tower system comprises at least one tower, an outlet duct, and a tower generator;

the at least one tower being in fluid communication with the accelerator unit;

the outlet duct being in fluid communication with the at least one tower, opposite of the accelerator unit; and the tower generator being engaged with the at least one tower.

* * * * *